US012648583B2

(12) United States Patent
Han

(10) Patent No.: US 12,648,583 B2
(45) Date of Patent: Jun. 9, 2026

(54) INFUSION OF EMULSIFIED HYDROPHOBIC ACTIVE INGREDIENTS INTO HIGH POLYPHENOLIC BEVERAGES

(71) Applicant: Vertosa, Inc., Pleasanton, CA (US)

(72) Inventor: Chunxiao Han, Pleasanton, CA (US)

(73) Assignee: Vertosa Inc., Berkeley, CA (US)

( * ) Notice: Subject to any disclaimer, the term of this patent is extended or adjusted under 35 U.S.C. 154(b) by 189 days.

(21) Appl. No.: 17/228,488

(22) Filed: May 17, 2021

(65) Prior Publication Data

US 2021/0274814 A1 Sep. 9, 2021

Related U.S. Application Data

(63) Continuation of application No. PCT/US2020/040170, filed on Jun. 29, 2020.

(60) Provisional application No. 62/870,228, filed on Jul. 3, 2019.

(51) Int. Cl.

| | |
|---|---|
| *A23L 2/56* | (2006.01) |
| *A23L 33/11* | (2016.01) |
| *A23L 33/115* | (2016.01) |
| *A23L 35/00* | (2016.01) |
| *C12G 3/055* | (2019.01) |

(52) U.S. Cl.

CPC ................. *A23L 2/56* (2013.01); *A23L 33/11* (2016.08); *A23L 33/115* (2016.08); *A23L 35/10* (2016.08); *C12G 3/055* (2019.02)

(58) Field of Classification Search

CPC .......... A23L 2/56; A23L 33/115; A23L 35/10; A23L 33/11; A23L 2/52; C12G 3/055; C12G 3/026; C12G 3/08

USPC .......................................................... 426/534

See application file for complete search history.

(56) References Cited

U.S. PATENT DOCUMENTS

| | | | |
|---|---|---|---|
| 10,016,363 B2 | 7/2018 | Bromley | |
| 2011/0033525 A1 | 2/2011 | Liu | |
| 2015/0030748 A1 | 1/2015 | Schultz et al. | |
| 2016/0081927 A1* | 3/2016 | Bromley ............ | A61K 2300/00 424/523 |
| 2016/0242430 A1 | 8/2016 | Daenzer-Alloncle et al. | |
| 2016/0279073 A1 | 9/2016 | Donsky et al. | |
| 2018/0042845 A1* | 2/2018 | Sinai ...................... | A61K 47/10 |
| 2019/0142034 A1 | 5/2019 | Forsythe | |

* cited by examiner

*Primary Examiner* — Emily M Le
*Assistant Examiner* — Tynesha L Mcclain
(74) *Attorney, Agent, or Firm* — Hunt IP Law

(57) ABSTRACT

Disclosed herein are beverage compositions comprising a mixture of: (a) an emulsion of about 2 wt % of a cannabinoid; about 2-10 wt % of a carrier oil; about 2-24 wt % of an amphipathic glycoside; and about 64-94 wt % of water; and (b) a polyphenol or tannin rich beverage base, wherein the beverage composition does not precipitate over an extended time. Also disclosed herein are methods of making and using the same.

12 Claims, 12 Drawing Sheets
(6 of 12 Drawing Sheet(s) Filed in Color)

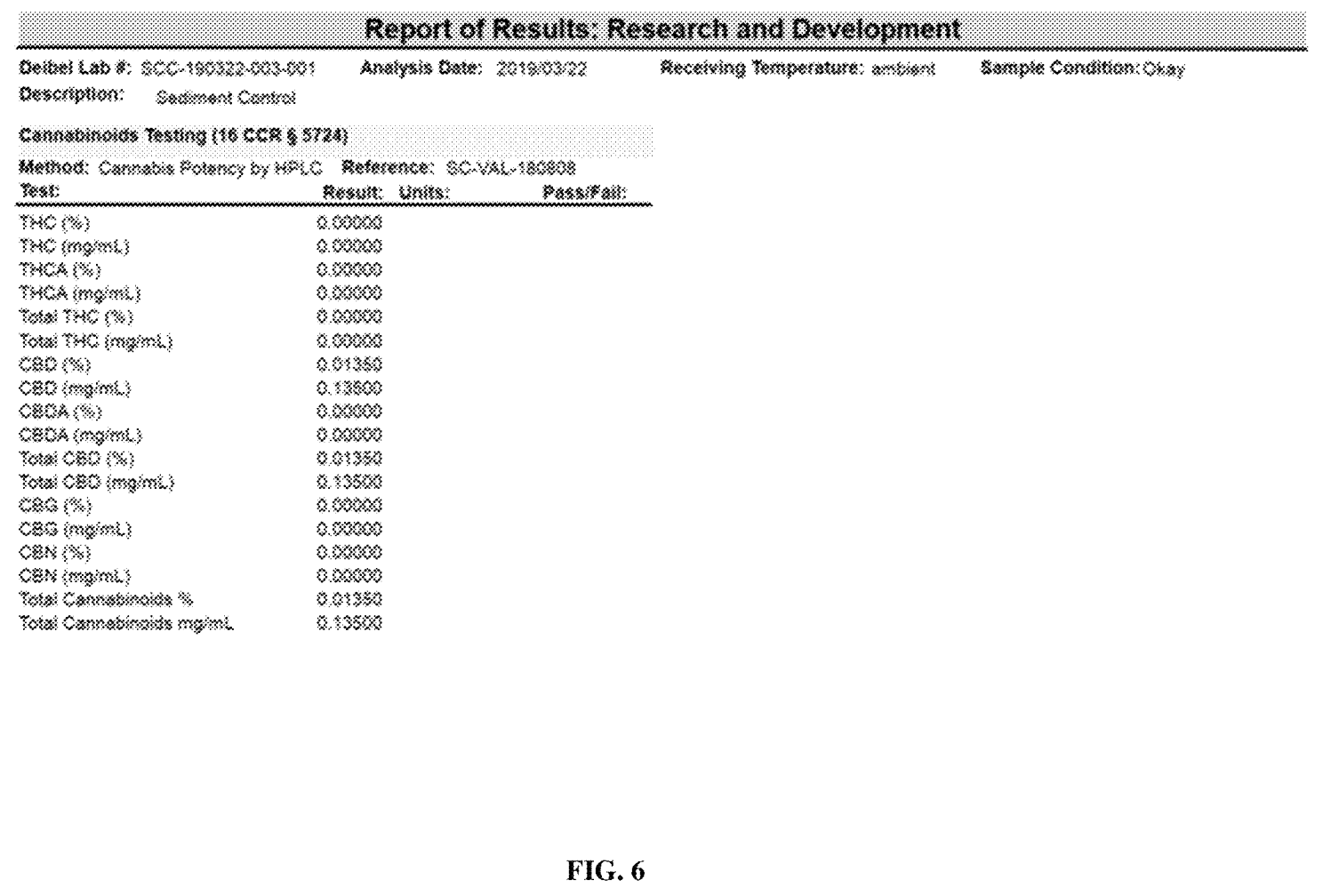

Report of Results: Research and Development

Deibel Lab #: SCC-190322-003-001 Analysis Date: 2019/03/22 Receiving Temperature: ambient Sample Condition: Okay

Description: Sediment Control

Cannabinoids Testing (16 CCR § 5724)

Method: Cannabis Potency by HPLC Reference: SC-VAL-180808

| Test: | Result: | Units: | Pass/Fail: |
|---|---|---|---|
| THC (%) | 0.00000 | | |
| THC (mg/mL) | 0.00000 | | |
| THCA (%) | 0.00000 | | |
| THCA (mg/mL) | 0.00000 | | |
| Total THC (%) | 0.00000 | | |
| Total THC (mg/mL) | 0.00000 | | |
| CBD (%) | 0.01350 | | |
| CBD (mg/mL) | 0.13500 | | |
| CBDA (%) | 0.00000 | | |
| CBDA (mg/mL) | 0.00000 | | |
| Total CBD (%) | 0.01350 | | |
| Total CBD (mg/mL) | 0.13500 | | |
| CBG (%) | 0.00000 | | |
| CBG (mg/mL) | 0.00000 | | |
| CBN (%) | 0.00000 | | |
| CBN (mg/mL) | 0.00000 | | |
| Total Cannabinoids % | 0.01350 | | |
| Total Cannabinoids mg/mL | 0.13500 | | |

FIG. 6

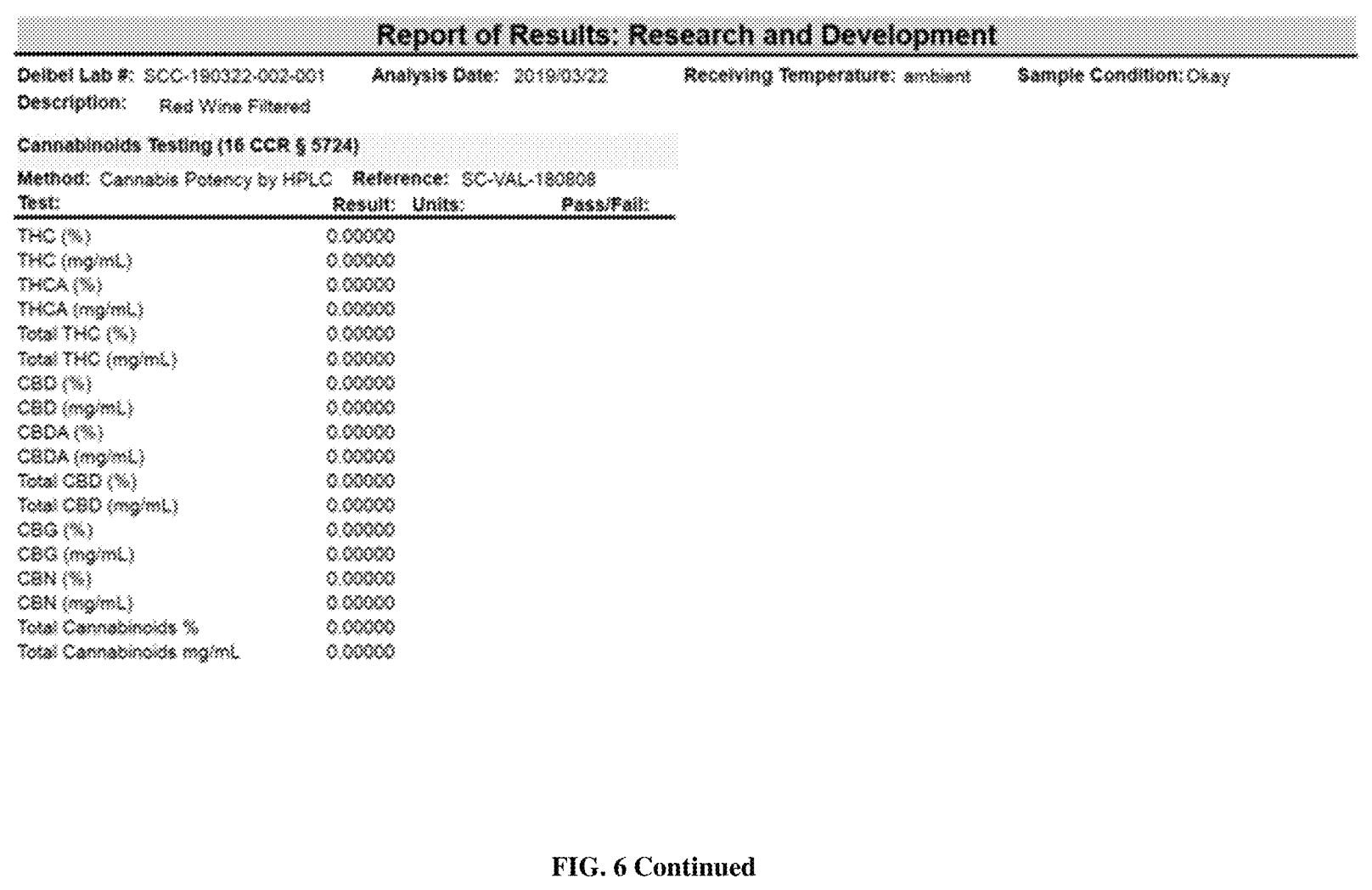

Report of Results: Research and Development

Deibel Lab #: SCC-180322-002-001 Analysis Date: 2019/03/22 Receiving Temperature: ambient Sample Condition: Okay

Description: Red Wine Filtered

Cannabinoids Testing (16 CCR § 5724)

Method: Cannabis Potency by HPLC Reference: SC-VAL-180808

| Test: | Result: | Units: | Pass/Fail: |
|---|---|---|---|
| THC (%) | 0.00000 | | |
| THC (mg/mL) | 0.00000 | | |
| THCA (%) | 0.00000 | | |
| THCA (mg/mL) | 0.00000 | | |
| Total THC (%) | 0.00000 | | |
| Total THC (mg/mL) | 0.00000 | | |
| CBD (%) | 0.00000 | | |
| CBD (mg/mL) | 0.00000 | | |
| CBDA (%) | 0.00000 | | |
| CBDA (mg/mL) | 0.00000 | | |
| Total CBD (%) | 0.00000 | | |
| Total CBD (mg/mL) | 0.00000 | | |
| CBG (%) | 0.00000 | | |
| CBG (mg/mL) | 0.00000 | | |
| CBN (%) | 0.00000 | | |
| CBN (mg/mL) | 0.00000 | | |
| Total Cannabinoids % | 0.00000 | | |
| Total Cannabinoids mg/mL | 0.00000 | | |

FIG. 6 Continued

Sample Details

Sample Name: DI-OD-190501

SOP Name: mansettings.nano

General Notes:

| | | | |
|---|---|---|---|
| **File Name:** | Nanogen NanoE from Xu.dts | **Dispersant Name:** | Water |
| **Record Number:** | 95 | **Dispersant RI:** | 1.330 |
| **Material RI:** | 1.59 | **Viscosity (cP):** | 0.8872 |
| **Material Absorbtion:** | 0.010 | **Measurement Date and Time:** | Wednesday, May 22, 2019 2:4 ... |

System

| | | | |
|---|---|---|---|
| **Temperature (°C):** | 25.0 | **Duration Used (s):** | 60 |
| **Count Rate (kcps):** | 510.6 | **Measurement Position (mm):** | 1.05 |
| **Cell Description:** | Disposable sizing cuvette | **Attenuator:** | 4 |

Results

| | | | Size (d.nm): | % Intensity: | St Dev (d.n... |
|---|---|---|---|---|---|
| Z-Average (d.nm): | 156.5 | **Peak 1:** | 184.5 | 100.0 | 79.64 |
| PdI: | 0.200 | **Peak 2:** | 0.000 | 0.0 | 0.000 |
| **Intercept:** | 0.935 | **Peak 3:** | 0.000 | 0.0 | 0.000 |

Result quality : Good

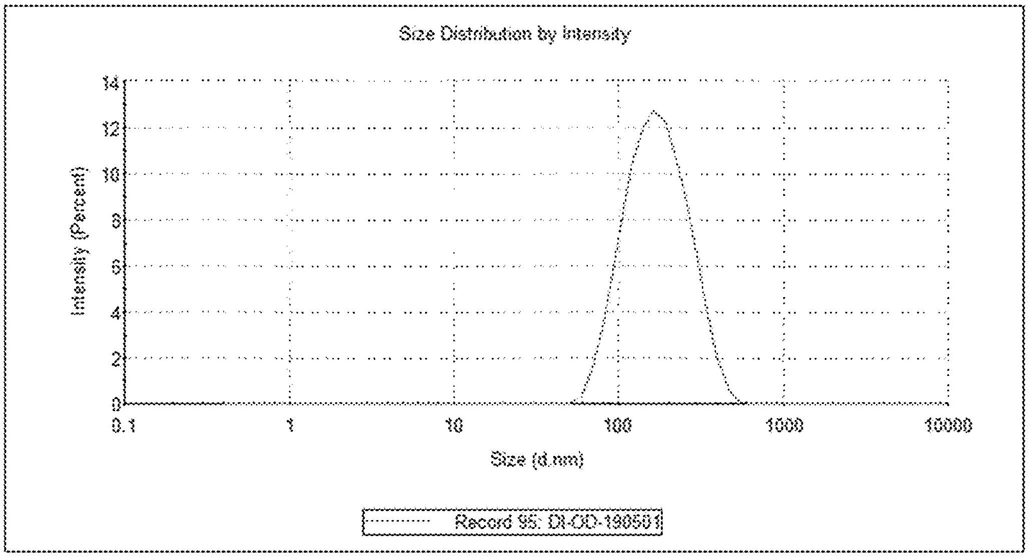

FIG. 9

Report of Results: Research and Development

Deibel Lab #: SCC-190509-003-001 Analysis Date: 2019/05/10 Receiving Temperature: ambient Sample Condition: Okay

Description: OD in Red Wine

Cannabinoids Testing (16 CCR § 5724)

Method: Cannabis Potency by HPLC Reference: SC-VAL-180808

| Test: | Result: | Units: | Pass/Fail: |
|---|---|---|---|
| Total package weight (g) | | | |
| THC (%) | 0.00000 | | |
| THC (mg/mL) | 0.00000 | | |
| THCA (%) | 0.00000 | | |
| THCA (mg/mL) | 0.00000 | | |
| Total THC (%) | 0.00000 | | |
| Total THC (mg/mL) | 0.00000 | | |
| CBD (%) | 0.01050 | | |
| CBD (mg/mL) | 0.10500 | | |
| CBDA (%) | 0.00000 | | |
| CBDA (mg/mL) | 0.00000 | | |
| Total CBD (%) | 0.01050 | | |
| Total CBD (mg/mL) | 0.10500 | | |
| CBG (%) | 0.00000 | | |
| CBG (mg/mL) | 0.00000 | | |
| CBN (%) | 0.00000 | | |
| CBN (mg/mL) | 0.00000 | | |
| Total Cannabinoids % | 0.01050 | | |
| Total Cannabinoids mg/mL | 0.10500 | | |

FIG. 10

Report of Results: Research and Development

Deibel Lab #: SCC-190509-004-001 Analysis Date: 2019/05/10 Receiving Temperature: ambient Sample Condition: Okay

Description: OD in Harmless Harvest

Cannabinoids Testing (16 CCR § 5724)

Method: Cannabis Potency by HPLC Reference: SC-VAL-180808

| Test: | Result: | Units: | Pass/Fail: |
|---|---|---|---|
| Total package weight (g) | | | |
| THC (%) | 0.00000 | | |
| THC (mg/mL) | 0.00000 | | |
| THCA (%) | 0.00000 | | |
| THCA (mg/mL) | 0.00000 | | |
| Total THC (%) | 0.00000 | | |
| Total THC (mg/mL) | 0.00000 | | |
| CBD (%) | 0.01010 | | |
| CBD (mg/mL) | 0.10100 | | |
| CBDA (%) | 0.00000 | | |
| CBDA (mg/mL) | 0.00000 | | |
| Total CBD (%) | 0.01010 | | |
| Total CBD (mg/mL) | 0.10100 | | |
| CBG (%) | 0.00000 | | |
| CBG (mg/mL) | 0.00000 | | |
| CBN (%) | 0.00000 | | |
| CBN (mg/mL) | 0.00000 | | |
| Total Cannabinoids % | 0.01010 | | |
| Total Cannabinoids mg/mL | 0.10100 | | |

FIG. 11

INFUSION OF EMULSIFIED HYDROPHOBIC ACTIVE INGREDIENTS INTO HIGH POLYPHENOLIC BEVERAGES

This patent application is a bypass continuation application of and claims priority from PCT/US2020/040107, filed on Jun. 29, 2020, which in turn claims the benefit of U.S. Provisional Patent Application No. 62/870,228, filed Jul. 2, 2019. The entire contents of each of the foregoing are hereby incorporated by reference herein.

FIELD OF THE INVENTION

The field of the invention is stabilized cannabinoid emulsions in tannin or polyphenol-rich beverages.

BACKGROUND

The following description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

There are many ways to administer medical and recreational cannabis, however, one common problem with currently available cannabinoid compositions and methods of administration is that cannabinoids are not water soluble and therefore only a small percentage of the consumed cannabinoid content is absorbed by the human body. Moreover, because cannabinoids are not water soluble, it is difficult to put it in common foods and drinks. Finally, the low aqueous solubility also contributes to lower potency and slower onset of action in lower doses. To overcome these problems cannabinoids may be infused in drinks as an emulsion.

Unfortunately, currently known cannabinoid emulsions are typically not compatible with drinks that contain relatively high concentration of polyphenols and/or tannins, such as red wine. Each 6 oz glass of red wine usually contains about 200 mg of polyphenols. When a cannabinoid infusion emulsion made from common emulsifiers, such as polyethylene glycol based, polyglycerol based, or lecithin based emulsifiers, is introduced into tannin rich drinks such as red wine, an immediate cloudiness is observed right after infusion. After that, in about 30 minutes, heavy sedimentation occurs, wherein the sediments contain the cannabinoids.

While a number of recipes for homemade cannabis-infused wine are available on various websites, these recipes typically disclose infusing wine with cannabis, followed by immediate consumption. However, with such recipes, the quantity and quality of the cannabinoids and their bioavailability is often unpredictable. Moreover, upon storage of such beverages, the cannabinoids and their emulsions typically start to precipitate anywhere from couple of hours to couple of days and start to lose potency.

Thus, there remains a need in the art for improved compositions of cannabinoids that remain dispersed in drinks having high concentrations of polyphenol or tannin.

SUMMARY OF THE INVENTION

The inventive subject matter provides new compositions of cannabinoid emulsions that remain dispersed in high polyphenol beverages such as red wine, pomegranate juice, grape juice, raspberry juice, apple juice, young coconut water or any beverages that have those juices as ingredients. Unexpectedly, the emulsions presented herein have a remarkable stability in solution, and particularly in solutions that are rich in polyphenols and/or tannins. Notably, among a large variety of potential emulsifying agents, only very narrow group afforded solution stability as is described in more detail below.

In one aspect of the instant disclosure, provided herein is an emulsion system that is physically compatible with high polyphenolic beverages, comprising: about 2 wt % of a cannabinoid; about 2-10 wt % of a carrier oil; about 2-24 wt % of an amphipathic glycoside; and about 64-94 wt % of water; and wherein the emulsion may be mixed with red wine to produce cannabis infused red wine targeting different levels of transparency, taste and experience from consuming the cannabinoids. Preferably, the amphipathic glycoside is selected from the group consisting of sucrose monoester of lauric acid, sucrose monoester of palmitic acid, quillaja saponin, and gum acacia. The quillaja saponin may be a commercially available product such as Q-Naturale® 100, Q-Naturale® 200, Q-Naturale® 200V, and/or Q-Naturale® 300.

In one embodiment, the carrier oil amount is at least the same amount as the cannabinoid, the sucrose esters are at least 0.5 times the total amount of cannabinoid and carrier oil, and the sunflower lecithin is at least 0.15 times the amount of sucrose esters. The emulsion droplet size is about 80 nm, which enables low turbidity (~30 NTU) of the infused product, or about 200 nm, which enables medium turbidity (~750 NTU) of the infused product, or about 500 nm, which enables high turbidity (~1450 NTU) of the infused product. In one embodiment, the amount of carrier oil is at least equal to the amount of the cannabinoid, and/or the amount of quillaja saponin is at least 0.25 times the total amount of the cannabinoid and carrier oil. In another embodiment, the carrier oil is at least the same amount as the cannabinoid, the amount of gum acacia is at least 1.5 times the total amount of cannabinoid and carrier oil.

The emulsion may further comprise a co-emulsifier, such as gum acacia or quillaja saponin. The carrier oil may be sunflower oil, olive oil, coconut oil, sesame oil, avocado oil, palm oil, soybean oil, corn oil, peanut oil, canola oil, or other types of medium-chain triglyceride oil.

In one embodiment, the cannabinoid is contemplated to be Tetrahydrocannabinol (THC) or Cannabidiol (CBD), any other single cannabinoids or combinations thereof. The purity of the cannabinoid can be low pure (full plant distillate) or high pure (distillate). In one embodiment, the cannabinoid is selected from Tetrahydrocannabinolic acid A (THCA-A), Tetrahydrocannabinolic acid B (THCA-B), Tetrahydrocannabinol (THC), Tetrahydrocannabinolic acid C (THCA-C), Tetrahydrocannbinol C (THC-C), Tetrahydrocannabi varinic acid (THCVA), Tetrahydrocannabivarin (THCV), Tetrahydrocannabiorcolic acid (THCA-C), Tetrahydrocannabiorcol (THC-C), Delta-7-cis-iso-tetrahydrocannabi varin, A-tetrahydrocannabinolic acid (A8-THCA), A-tetrahydrocannabinol (A-THC), Cannabidiolic Acid (CBDA), Cannabidiol (CBD), Cannabidiol monomethyl ether (CBDM), Cannabidiol-C (CBD-C), Cannabidivarinic Acid (CBDVA), Cannabidivarin (CBDV), Cannabidiorcol (CBD-C), Cannabigerolic Acid (CBGA), Cannabigerolic Acid monomethylether (CBGAM), Cannabigerol (CBG), Cannabigerol monomethylether (CBGM), Cannabigerovarinic Acid (CBGVA), Cannabigerovarin (CBGV), Cannabichromenic Acid (CBCA), Cannabichromene (CBC), Cannabichromevarinic Acid (CB CVA), Cannabichromevarin (CBCV), Cannabicyclolic acid (CBLA), Cannabicyclol (CBL), Cannabicyclovarin (CBLV), Cannabielsoic acid A (CBEA-A), Cannabielsoic acid B (CBEA-B), Cannabielsoin (CBE), Cannabinolic acid (CBNA), Cannabinol (CBN), Cannabinol methylether (CBNM), Cannabinol-C (CBN-C), Cannabivarin (CBV), Cannabino-C (CBN-C), Cannabiorcol (CBN-C), Cannabinodiol (CBND), Cannabinodivarin (CBDV), Cannabitriol (CBT), 10-Ethoxy-9-hydroxy-A"-tetrahydrocannabinol, 8.9-Dihydroxy-A'-tetrahydrocannabinol (8.9-Di-OH CBT-C), Cannabitriolvarin (CBTV), Ethoxy-cannabitriol varin (CBTVE), Dehydrocannabifuran (DCBF), Cannbifuran (CBF), Cannabichromanon (CBCN), Cannabicitran (CBT), 10-Oxo-A'-tetrahydrocannabinol (OTHC), A-cis-tetrahydrocannabinol (cis-THC), Cannabiripsol (CBR), 3,4,5,6-tetrahydro-7-hydroxy-alpha-alpha-2-trim ethyl-9-n-propyl-2,6-methano-2H-1-benzoxocin-5-methanol (OH-iso-HHCV), Trihydroxy-delta-9-tetrahydrocannabinol (triCH-THC), Isocanabinoids, Epigallocatechin gallate, or combinations thereof.

The beverage base disclosed herein may be is red wine, de-alcoholic red wine, rosé wine, de-alcoholic rosé wine, green tea, black tea, a fruit juice such as pomegranate juice, grape juice, white grape juice, cranberry juice, raspberry juice, apple juice, watermelon juice, beetroot juice, oranges juice, peach juice, grapefruit juice, cherries juice, blueberries juice, cranberries juice, black elderberries juice, blackcurrants juice, plums juice, blackberries juice, strawberries juice, apricots juice, or young coconut water. The concentration of the cannabinoid in the beverage composition is between 10-500 mg/750 mL.

In one embodiment, the emulsion composition is compatible with velcorin process to be sterilized without losing emulsion stability, potency and flavor. In another embodiment, the emulsion composition is compatible with thermal processes, including tunnel pasteurization, retort, high temperature short time, aseptic and hot fill.

Preferably, the emulsion composition can be stored for at least 1 year, more preferably at least 2 years, and most preferably at least 3 years without aggregation or precipitation.

In one embodiment, the emulsion composition may further comprise vitamin A, D, E and Vitamin K, DHA, and/or omega 3, punicic acid (omega 5), fish oil, flaxseed oil, hemp seed oil, curcumin, lutein, CoQ-10, flavor oil such as orange oils, peppermint oil, almond oil, lemon oil, essential oils, terpenes derived from cannabis or regular plants, such as limonene, alpha-pinene, beta-pinene, beta-caryophyllene, myrcene, linalool, eucalyptol, alpha-bisabolol, humulene, camphene, terpineol, valencene, geraniol, Delta 3 carene.

In another aspect, disclosed herein is a method of controlling onset and/or duration of THC/CBD effect in a polyphenol/tannin rich beverage comprising an emulsion of (a) about 2 wt % of a cannabinoid; (b) about 2-10 wt % of a carrier oil; (c) about 2-24 wt % of an amphipathic glycoside; and (d) about 64-94 wt % of water, the method comprising: providing a sucrose ester and sunflower lecithin as the amphipathic glycoside for an onset and offset time of 5-10 minutes and about 3 hours respectively; providing an extract of a quillaja saponin as the amphipathic glycoside for an onset and offset time of about 10 minutes and about 5 hours respectively; and providing gum acacia and/or pre-hydrolyzed gum acacia as the amphipathic glycoside for an onset and offset time of about 20 minutes and 6 hours respectively.

In another aspect, disclosed herein is a method of controlling the taste of cannabis infused polyphenol/tannin rich beverage, comprising an emulsion of (a) about 2 wt % of a cannabinoid; (b) about 2-10 wt % of a carrier oil; (c) about 2-24 wt % of an amphipathic glycoside; and (d) about 64-94 wt % of water, the method comprising: providing a sucrose ester and sunflower lecithin as the amphipathic glycoside for 20% more bitter than regular wine, which adds taste complexity; providing an extract of a quillaja saponin as the amphipathic glycoside for no change on bitterness compared to regular wine; and providing gum acacia and/or pre-hydrolyzed gum acacia as the amphipathic glycoside for adding no bitterness but slight smooth mouthfeel.

In yet another aspect, disclosed herein is a beverage composition comprising a mixture of: an emulsion of (a) about 2 wt % of a cannabinoid; (b) about 2-10 wt % of a carrier oil; (c) about 2-24 wt % of an amphipathic glycoside; and (d) about 64-94 wt % of water; and a polyphenol or tannin rich beverage base.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 illustrates, in accordance with the embodiments herein, filtered water sediment control VS Filtered red wine after sedimentation: Filter water has CBD concentration as 0.135 mg/mL, based on 100 mL, it should have 13.5 mg CBD, which is very close to expected 15 mg CBD which is infused. Red wine showed CBD concentration as Omg/mL, which means the active ingredient CBD crushed out with sedimentation.

FIG. 9 illustrates, in accordance with the embodiments herein, DLS results for emulsion made for high polyphenolic drinks.

FIG. 10 illustrates, in accordance with the embodiments herein, CBD emulsion infused into red wine can be detected by HPLC-DAD method accurately.

FIG. 11 illustrates, in accordance with the embodiments herein, CBD emulsion infused into young coconut water (a brand called Harmless Harvest) can be detected by HPLC-DAD method accurately

DETAILED DESCRIPTION

Figure 1:
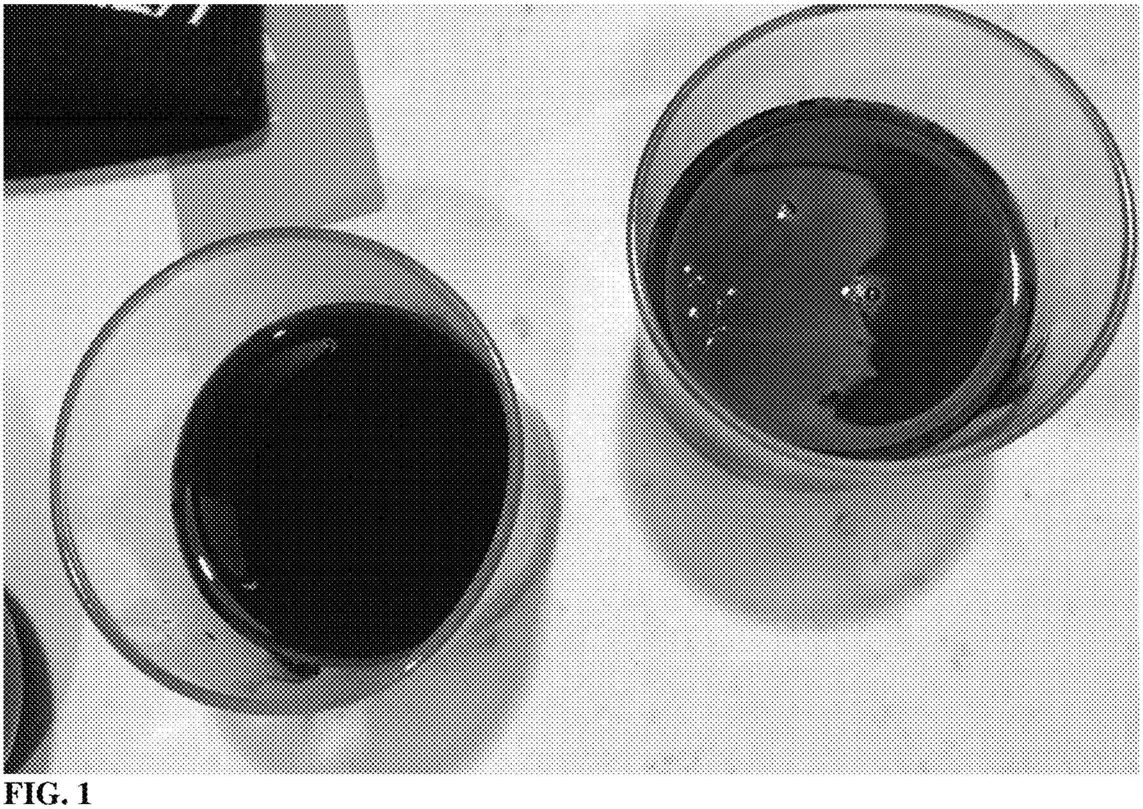
FIG. 1 illustrates, in accordance with the embodiments herein, (A) infusion of polyethylene glycol-based emulsion into red wine; and (B) sedimentation immediately after infusion.

The inventor has surprisingly found that the beverage compositions disclosed herein can be storage stable for up to 6 months or up to 12 months, and even longer and the potency of the cannabinoids does not decrease with time, even where the beverage composition is rich in polyphenols and/or tannins. Moreover, the inventor has unexpectedly found that the color, taste, and onset/offset time for cannabis effect can be controlled by controlling the components in the emulsion, specifically by controlling the amphipathic glycoside used in the emulsion. For example, contemplated beverage compositions comprise a mixture of (a) an emulsion of about 2 wt % of a cannabinoid; about 2-10 wt % of a carrier oil; about 2-24 wt % of an amphipathic glycoside; and about 70-94 wt % of water; and (b) a polyphenol or tannin rich beverage base.

The cannabinoid preferably comprises CBD or THC. The polyphenol or tannin rich beverage may be red wine, which could be either the regular alcoholic red wine or de-alcoholized red wine. The polyphenol or tannin rich beverage may also be green tea, black tea, and various fruit juices such as pomegranate juice, grape juice, raspberry juice, apple juice, and/or young coconut water.

Preferably, the concentration of the cannabinoid in the beverage composition is between 0.0001% to 2%. In other words, the amount of CBD or THC or combinations thereof in the cannabis wine would be between 0.0001% to 2%. This could be achieved by mixing 1 mL of the emulsion disclosed above with 5-10 mL, or more preferably 10-15 mL, or more preferably 15-20 mL, or more preferably 20-25 mL, or more preferably 25-30 mL, or more preferably 30-35 mL, or more preferably 35-40 mL, or more preferably 40-45 mL, or more preferably 45-50 mL of red wine or any other polyphenol or tannin rich beverage disclosed herein. In other embodiments, about 1-10 mL of the emulsion is mixed with about 1 L of the polyphenol or tannin rich beverage base.

As disclosed further herein, the beverage compositions are storage stable, and can be stored for at least 1 year, more preferably at least 2 years, and most preferably at least 3 years without change in cannabinoid concentration in the beverage. Ensuring that foods and beverages remain stable during the required shelf life is critical to their success in the marketplace, yet difficulties are encountered in this area. The instant disclosure discloses beverage compositions that have stable shelf life. The effect of the ingredients in emulsions have been carefully tested for stability and shelf life assessment by using accelerated testing and shelf life modeling.

The preferred amphipathic glycoside used in the disclosed emulsions and beverage compositions allows the beverage to be compatible with multiple sterilization processes such as retorting, aseptic process, tunnel pasteurization or cold fill. Since most wine products are preserved with Velcorin (dimethyldicarbonate) to ensure long shelf life, the emulsion infused red wine was treated by Velcorin, and it was found that physical stability, flavor and designed experience were not lost as a result of the Velcorin treatment. There is no visual instability and no microbial growth in the 750 mL wine glass bottle for at least 2 years.

The infused product can also go through other thermal processing for sterilization without losing the emulsion stability, potency and taste. The processes include tunnel pasteurization, retort, high temperature short time (HTST) and hot fill.

The emulsion disclosed herein comprises an amphipathic glycoside. The term "amphipathic glycoside" refers to a compound formed from a carbohydrate portion and lipophilic moiety that is typically bound to the carbohydrate portion via a hydroxyl group of the carbohydrate portion, the resultant compound having both hydrophilic and hydrophobic parts. The carbohydrate portion contemplated herein may comprise monosaccharides, disaccharides, oligosaccharides, polysaccharides, sugar alcohols etc. The hydrophobic portion may comprise hydrocarbon, steroid (plant or animal), lipoprotein, etc.

In one embodiment, the amphipathic glycoside may be a sucrose ester, such as sucrose monoester of lauric acid, sucrose monoester of palmitic acid, sucrose monoester of stearic acid, or combinations thereof. In another embodiment, the amphipathic glycoside may be an extract of quillaja saponin, which is commercially sold as Q-Naturale® 100, Q-Naturale® 200, Q-Naturale® 200V, and/or Q-Naturale® 300. Saponins are amphiphilic, high molecular weight compounds comprising glycosides having sugar residues linked to triterpenes or steroid aglycones. In another embodiment, the amphipathic glycoside may be gum acacia, and pre-hydrolyzed gum acacia. Gum acacia is a biopolymer consisting of arabinose and galactose monosaccharides or polysaccharides. Gum acacia is an arabinogalactan polysaccharide with rhamnose and glucoronic acid end units containing two percent proteins (OH-proline, serine, proline) and four sugars (L-arabinose, L-rhamnose, D-galactose, D-glucuronicacid) (Idris et al, Food Hydrocolloids, Part I to III, 12, 1998, 379-388). It is a natural amphiphilic or hydrocolloid. Gum acacia is obtained as sticky exudates from the stems and branches of acacia trees when they are subjected to stress. As used herein, gum acacia refers to both natural or synthetically modified acacia gum.

In one embodiment, the amphipathic glycoside is sucrose monoester of lauric acid or sucrose monoester of palmitic acid. The composition may further comprise sunflower lecithin as a co-emulsifier. The carrier oil amount is contemplated to be at least the same amount as the cannabinoid, the sucrose esters are at least 0.5 times the total amount of cannabinoid and carrier oil, and the sunflower lecithin is at least 0.15 times the amount of sucrose esters.

In one embodiment, the amphipathic glycoside is an extract of the quillaja saponin tree. Preferably, a commercially available variety of the quillaja saponin tree extract, such as Q Naturale is used. The Q-Naturale may be Q-Naturale® 100, Q-Naturale® 200, Q-Naturale® 200V, and/or Q-Naturale® 300. The amount of carrier oil may be at least equal to the amount of the cannabinoid, and/or the amount of Q-Naturale® is at least 0.25 times the total amount of the cannabinoid and carrier oil. The beverage composition may further comprise Gum Acacia as a co-emulsifier.

In another embodiment, the amphipathic glycoside is gum acacia, and/or pre-hydrolyzed gum acacia. In this embodiment, the carrier oil is at least the same amount as the cannabinoid, the amount of gum acacia is at least 1.5 times the total amount of cannabinoid and carrier oil. The composition may further comprise Q-Naturale® as a co-emulsifier.

The emulsion disclosed herein comprises an edible carrier oil, such as sunflower oil, olive oil, coconut oil, sesame oil, avocado oil, palm oil, soybean oil, corn oil, peanut oil, canola oil, or combinations thereof. In some embodiments, the emulsion is sterilized prior to mixing with the polyphenol or tannin rich beverage. In some embodiments, the emulsion further comprises vitamin D, DHA, and/or omega 3.

The emulsion disclosed herein is used as a vehicle to deliver oil based active ingredients into aqueous phase. This is because the emulsifiers lower the surface tension, which in turn makes smaller oil droplets suspend within water. On one hand, oil based active ingredients can be versatile, including, cannabinoids, terpenes, fish oil, EPA, DHA, Co-Q10, or just simply different oils and fats for Keto therapy. On the other hand, in some instances these oil-based active ingredients may be desirable to be put in a drink such as water, beer, wine, soda, juice, smoothie, coffee, and even spirits. In these cases, emulsion compositions of these oil based active ingredients are desirable.

In one embodiment, a cannabis infused red wine was developed because it advantageous to have a beverage that taste and looks like a red wine, but instead of having ethanol, it has cannabis. In this case, upon consuming this beverage, the psychoactive feeling from certain cannabinoid would be generated, rather than the feeling obtained from alcohol in a wine. Presently, US law does not allow mixing ethanol and cannabinoid, but laws in countries outside USA allows such a mixing. So in order to make the product, regular red wine may be de-alcoholised by selectively evaporating the ethanol off. After that, cannabinoids are introduced usually in the form of an emulsion.

One problem faced by the inventor in making cannabis infused wine is compatibility of emulsifiers with the drink base, especially when the drink contains high concentration of polyphenol, or more specifically, tannin. When infusion emulsion made from commonly used emulsifiers (Polyethylene glycol based, Polyglycerol based or lecithin based) into tannin rich drink such as pomegranate juice, a cloudy liquid is formed almost immediately, as shown in FIG. 1.

Figure 2:
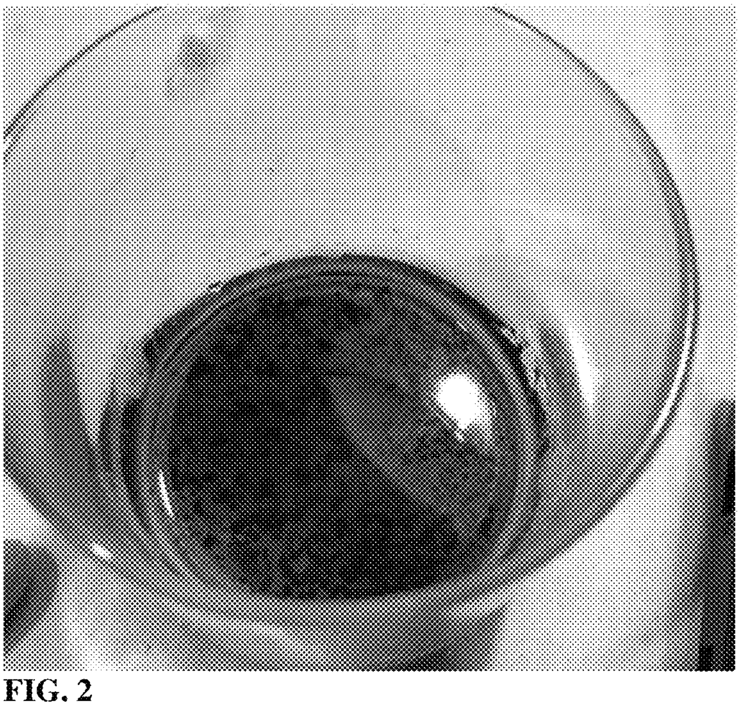
FIG. 2 illustrates, in accordance with the embodiments herein, 30 mins after infusion polyethylene glycol-based emulsion into red wine, see sedimentations crushing out.

The inventor sought to find a cannabinoid emulsion composition that would remain dispersed in red wine. When a polyethylene glycol, polyglycerol, and lecithin-based emulsion infused into red wine and other tannin rich beverages, a heavy sedimentation was seen after about 30 mins, shown in FIG. 2, FIG. 3 and Table 1.

Figure 3:
FIG. 3 illustrates, in accordance with the embodiments herein, sedimentation study of cannabis emulsion with certain juices.

These two trials showed that phenol or polyphenol cause the instability of the emulsion. However, upon further testing with multiple juices reported in Table 1, it was determined that one type of polyphenol, tannins, are the most critical element that trigger the reaction. And only when the tannin concentration is higher in the drink, then this reaction is easier to happen. Moreover, FIG. 3 illustrates some of the experiments with certain juices.

TABLE 1

Summary of polyphenol types and concentration in major juices

| Beverage base | Major Polyphenol Types | Polyphenol Concentration | Sedimentation with emulsion?* |
|---|---|---|---|
| Regular red wine | Tannin | 100-400 mg/100 mL | Yes |
| Grape Juice | Tannin, Ellagic Acid | 300-600 mg/100 mL | Yes |
| White Grape Juice | Tannin, Ellagic Acid | 200-400 mg/100 mL | Yes |
| Pomegranate | Tannin, Ellagic Acid | 200-500 mg/100 mL | Yes |
| Young coconut water | Tannin | 150-300 mg/100 mL | Yes |
| Cranberry Juice | Tannin, Ellagic Acid | 50-100 mg/100 mL | Yes |
| White wine | Tannin | 25 mg/100 mL | No |
| Rosé Wine | Tannin | 40-55 mg/100 mL | No |
| Strawberry | Ellagic Acid | 225 mg/100 mL | No |
| Raspberry | Chlorogenic Acid | 126 mg/100 mL | No |
| Blueberry | Chlorogenic Acid | 525 mg/100 mL | No |
| Blackberry | Chlorogenic Acid | 248 mg/100 mL | No |
| Prune Juice | Chlorogenic Acid | 215 mg/100 mL | No |
| Carrot Juice | NA | NA | No |
| Orange Juice | NA | NA | No |
| Lemon Juice | NA | NA | No |
| Carets Juice | NA | NA | No |
| Turmeric Juice | NA | NA | No |
| Celery Juice | NA | NA | No |

*The emulsion used in Table 1 is a polyethylene glycol, polyglycerol, and lecithin based emulsion Table 1 summarizes polyphenol types and concentration in major juices. The experiment showed that sedimentation occurs only in drinks that contain tannin and only when the tannin concentration is high. Moreover, when the beverages do not contain tannin, but contain high concentration of other polyphenols, there is no sedimentation. Finally, when drinks contain tannin but at low concentrations, there is no sedimentation.

The chemical structures of polyphenols provide a possible explanation. Phenol is the structure of one hydroxyl group on benzene ring. Polyphenol would mean there are many phenol-like groups within one molecule. For example, Ellagic acid and Chlorogenic acid are small polyphenols, which only contain less than 5 phenol groups, shown in Formula 1 and 2

Formula (1)

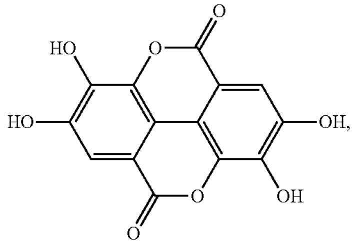

Ellagic acid

Formula (2)

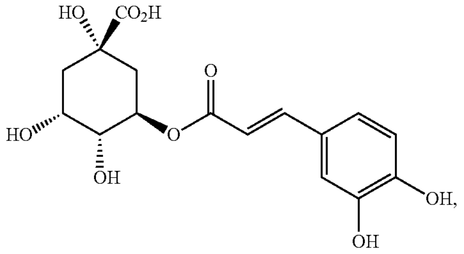

Chlorogenic acid

Tannin, on the other hand, are a collection of large molecules that contains several phenol groups. Formula (3) shows one example of a tannin. Small polyphenols do not tend to aggregate and sediment with emulsifiers. Only when polyphenol gets large enough (for example, tannin), the sophisticated molecular structure provides more types of binding sites that trigger aggregation and sedimentation when emulsion is added.

Formula (3)

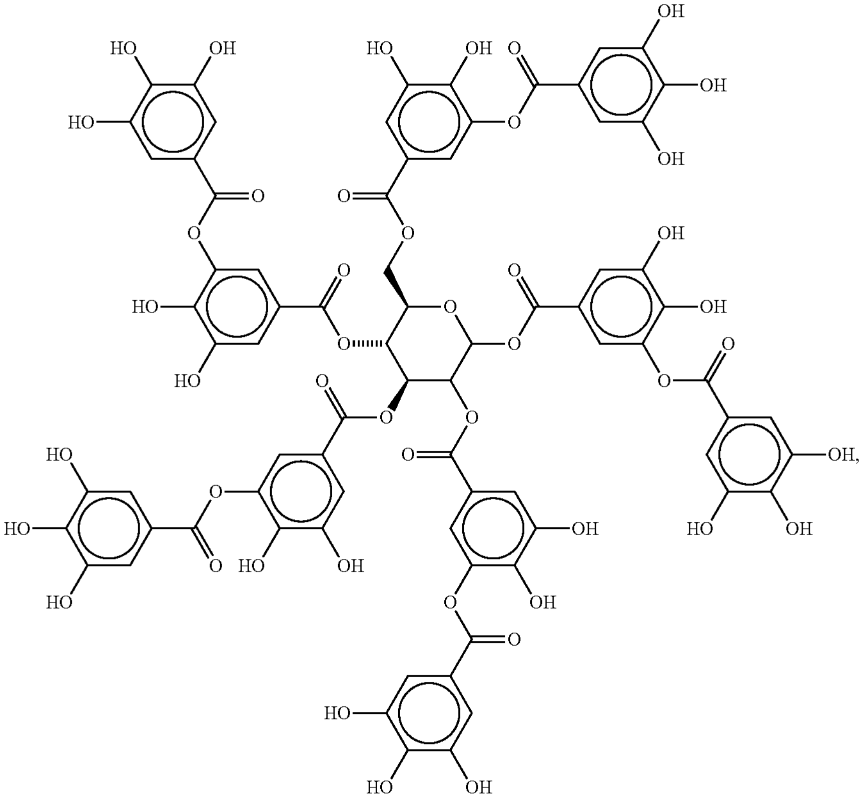

Tannin

Similar sedimentation of the emulsion was also observed with young coconut water. Like apple, lettuce and mushroom, young coconut water contains an enzyme called Polyphenol oxidase (PPO). One function of PPO is that under oxygen, PPO tends to joint phenol groups together. Given enough time, PPO can facilitate formation of tannin. Thus, when apple and lettuce was cut and exposed to air for some time, the color changed to red (tannin color). And most of the young coconut water appears to be pink due to tannin.

It is worthwhile to notice that the current U.S. regulation forbids manufacturers to produce a beverage that contains both ethanol and cannabinoid; however, such a beverage may be sold in other parts of the world, for example in Europe. In some embodiments, the red wine used in this study was de-alcoholized to be <0.5% ethanol. The de-alcohol technology is called spin-cone, where the regular wine is spun throughout a wide area at fast speed while a hot stream of air pass through the surface, thus evaporating out the ethanol but keep all other ingredients in the red wine. However, because de-alcoholization does not change the tannin concentration or structure, the methods and compositions used herein may also be applied to regular red wine, and such use in regular red wine is contemplated by this present disclosure. In another embodiment, regular alcoholic red wine was used in the studies herein.

Figure 4:
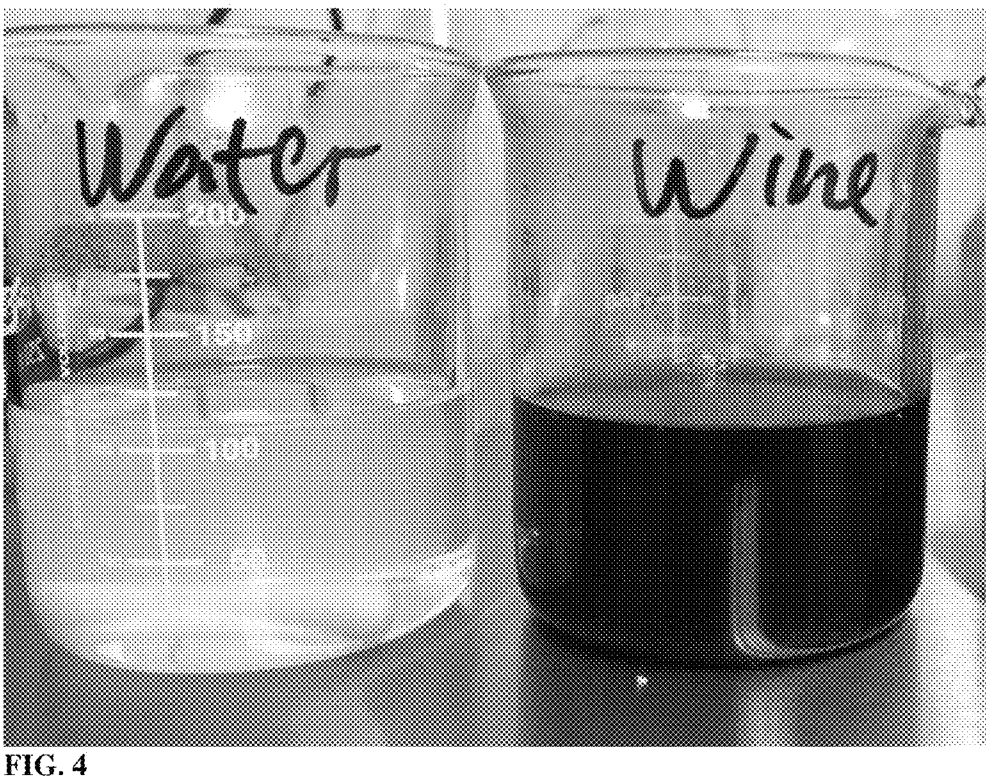
FIG. 4 illustrates, in accordance with the embodiments herein, control test of water and red wine after infusing polysorbate/lecithin based emulsions.
Figure 5:
FIG. 5 illustrates, in accordance with the embodiments herein, filtering out sedimentation of red wine through 2 um filter paper.

In another aspect, the inventor also tested how sedimentation affects the active ingredient within the emulsion droplet. The control study in this case was just water. A typical emulsion made by polysorbate and sunflower lecithin, was infused with 15 mg worth of CBD, into the both 100 mL water and red wine, as illustrated in FIG. 4. After overnight's settlement, the sedimentation was filtered through a 2 um filter paper, as illustrated in FIG. 5. Then the filtered liquid was tested for potency study through HPLC-DAD. The results showed that there is ~10 mg CBD in water control but 0 mg CBD in filtered red wine, as illustrated in FIG. 6. This result showed that the active ingredient, in this case CBD, crushed out during the sedimentation.

Developing an emulsion system that is compatible with high tannin drinks would be beneficial considering infusing functional active ingredients (cannabinoids or plant extracts) into drinks like red wine or pomegranate juice. Tannin tended to bind with certain emulsifiers and sediment by crushing out of the drink. When this happens, the active ingredient from the emulsion also goes into the sediment, thus affecting the overall potency homogeneity of the infused beverage. This does not only affect the appearance of the drink, but also diminish the infusion purpose.

In one embodiment, the present disclosure provides a solution to this problem by developing a new emulsion composition that is compatible with high tannin drinks. While red wine was used in several of the experiments, a skilled artisan in the art would know that the emulsion could also be used in any other liquid that has high amounts of tannin.

There are two ways to solve this problem. One way is to treat the red wine first, to reduce its tannin concentration, and then an existing cannabinoid emulsion formula may be used to infuse the wine. Another way is to develop a new emulsion formula system that does not bind with tannin, so that it can be compatible with red wine.

Reducing Tannin in Red Wine

In one embodiment, the red wine's tannin was tested to a certain level so that the tannin left is not enough to bind with emulsifiers. This was done by two methods. The principle was to design a solution that will bind with tannin, add the solution into red wine, and optionally apply filtration to remove the sedimented tannin. Then infuse the target emulsion into the red wine.

The first trial was to reduce tannin using a mixture of 10-25% food grade hydrogen peroxide, 15-25% natural powder egg white, 20-30% sunflower lecithin, and the rest of the solution is water. When this solution was added to red wine, there is no obvious sedimentation from tannin or alike. But the flavor changed to be less stringent, which is caused by slightly reduced tannin. When the emulsion was added into treated red wine, sedimentation was seen immediately. Thus, it was found that this formulation reduces the tannin by a little, but not enough to make the emulsifier compatible with tannin.

In the second trial, the disclosed emulsion ingredient system was used without the active ingredient (cannabinoids) to infuse into red wine first, see table 2 for composition information. This emulsion without active ingredient is referred to as "Blank Emulsion". The goal was to make sure the tannin and the emulsifier in the "Blank Emulsion" bind sufficiently, then filter out the tannin and infuse the emulsion with active ingredient into the filtered liquid.

Figure 7:
FIG. 7 illustrates, in accordance with the embodiments herein, red wine treated by Blank Emulsion for overnight: observe sedimentation on the bottom.
Figure 8:
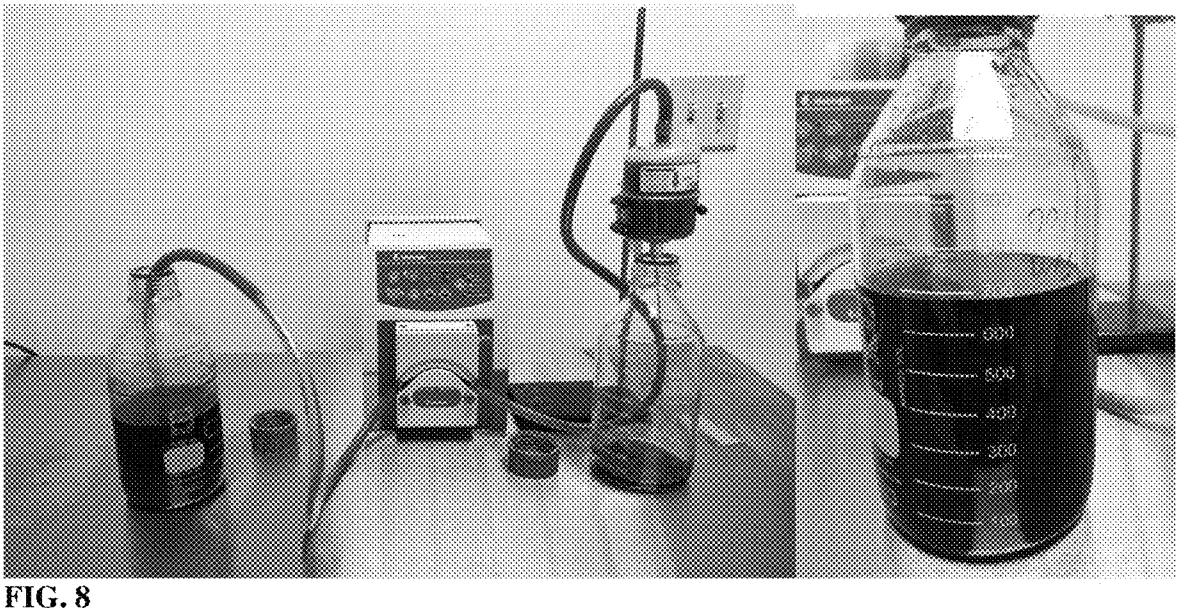
FIG. 8 illustrates, in accordance with the embodiments herein, filtering the sedimentations and obtained a clear liquid to be infused again with target emulsion.

One full bottle of red wine was poured out into a 1 L beaker, and 20 mL of the blank emulsion was added and stirred overnight. The tannin separated out and sedimented on the bottom as shown in FIG. 7. Then, the liquid was filtered through a 2 μm encapsulated filter which removed most of the sedimentations and made the liquid transparent and clear again, shown in FIG. 8. Then, an emulsion with 10 mg of CBD was infused into the red wine. There was no initial sign of cloudiness, but after overnight, slight sedimentation could still be observed on the bottom.

TABLE 2

Composition of Blank Emulsion and regular emulsion

| Emulsion ingredient list | Blank emulsion to infuse first | Regular emulsion to infuse after filtration |
|---|---|---|
| CBD | 0 g | 1 g |
| Coconut Oil | 5 g | 4 g |
| Polysorbate 20 | 5 g | 5 g |
| Sunflower lecithin | 3 g | 3 g |
| Water | 50 g | 50 g |

This cycle was repeated for couple of times to reduce the tannin step by step, until the ideal tannin concentration is reached. However, in practice, filtering large amount of wine with heavy sedimentation could not be efficient both on equipment and economics. Also, this method removed tannin, which in turn changed the flavor and taste of the red wine. So, removing the tannin from red wine or any other tannin rich beverage was not practical to scale. Thus, the first method did not work economically. Therefore, the inventor continued to search for an emulsion system whose emulsifier does not bind with tannin.

New Emulsion System that does not Bind with Tannin

The above problems led to try to design an emulsion that is stable with tannin. In order to do so, all the ingredients in the emulsion should be stable with tannin. De-alcoholized red wine was used as testing base and individually dose active ingredient (THC, CBD, DHA, EPA . . . ), carrier oil (coconut oil, olive oil . . . ), main surfactant (polysorbate, polyglycerol based, Q-Naturale®), co-surfactant (lecithin, Span.). After infusion, the red wine was allowed to sit for 30 days and then observe sedimentation levels.

Even to a trained chemist, the interaction between the final emulsion with the red wine is unpredictable. Emulsions made with different emulsifier systems were all tested using red wine to illustrate the compatibility. As discussed below, several different types of emulsifiers were tested, and most were incompatible with red wine. After numerous unsuccessful emulsions and trials and errors, the inventor was able to arrive at the emulsion compositions comprising amphipathic glycoside as disclosed herein.

Based on the emulsifier's origin, the emulsions were named either C (Conventional), N (Natural) and O (Organic). Table 3 below disclose the ratios of each tried emulsion in red wine.

TABLE 3

| Different cannabis emulsions tried in red wine | | | | | | | | |
|---|---|---|---|---|---|---|---|---|
| | C1 | C2 | C4 | C5 | N1 | N2 | O1 | O2 |
| CBD isolate (grams) | 1 | 1 | 1 | 1 | 1 | 1 | 1 | 1 |
| MCT Oil (grams) | 2 | 2 | 2 | 2 | 2 | 2 | 2 | 2 |
| Emulsifier Type, grams | Polysorbate 20, 2 | Polysorbate 60, 2 | Polysorbate 80, 2 | Vitamin E TPGS, 2 | Polyglyceryl-10 Oleate, 2 | Sucrose Esters, 2 | Quillaia Extract, 1 | Gum Acacia, 6 |
| Co-Emulsifier type, grams | Sunflower lecithin, 1 | NA | NA | NA | NA | Sunflower lecithin, 1 | NA | NA |
| Water (grams) | 44 | 44 | 45 | 45 | 45 | 44 | 45 | 41 |

Figure 12:
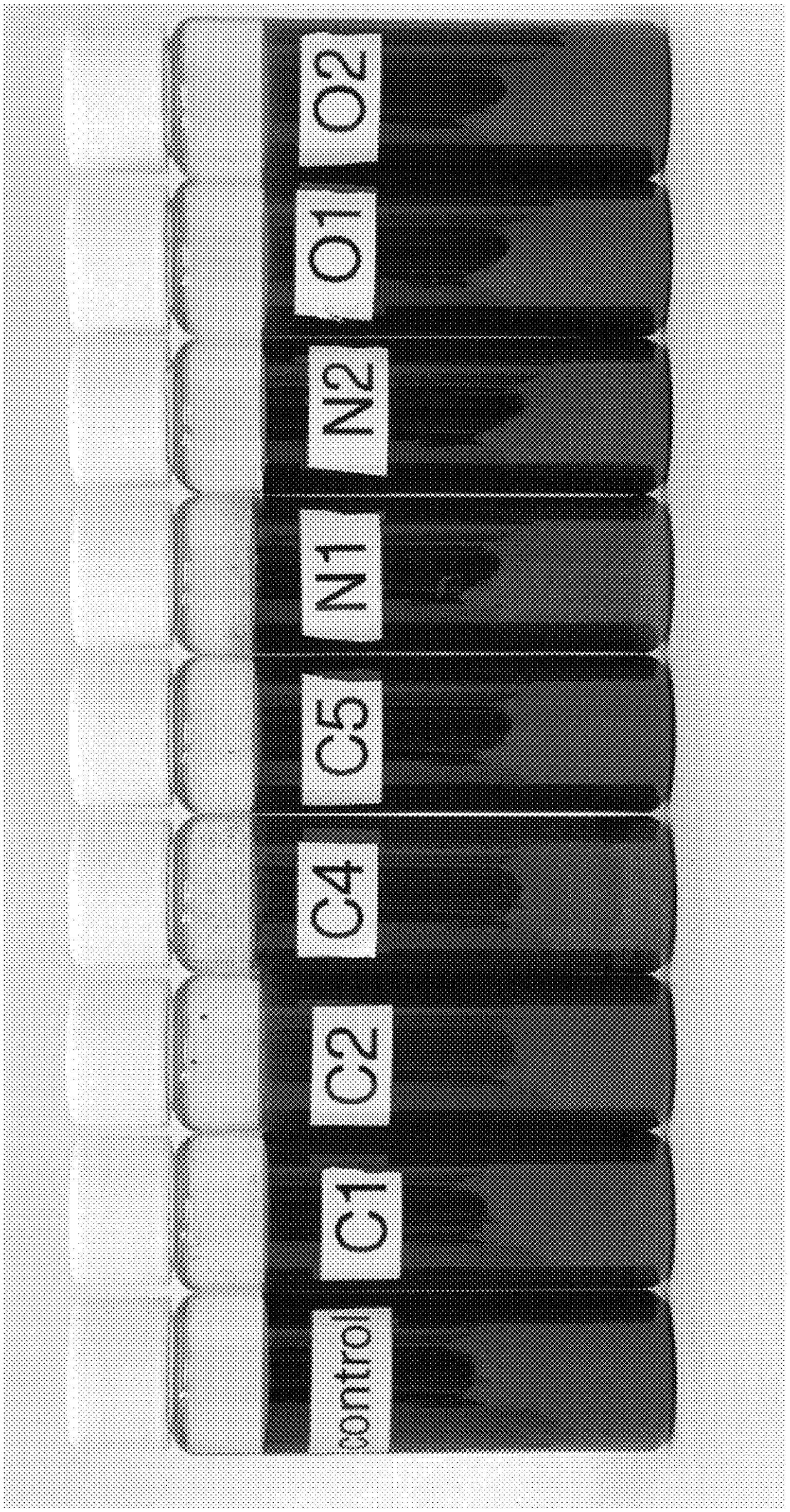
FIG. 12 illustrates 8 different cannabis emulsions infused red wine at 30 days post infusion. The instability between the emulsion and red wine can be visually observed.
Figure 13:
FIG. 13 illustrates C2 emulsion infused red wine samples have sediment after 30 days post infusion.
Figure 14:
FIG. 14 illustrates C5 emulsion infused red wine samples have sediment after 30 days post infusion.

After all the emulsions were produced, 0.1 mL of the emulsion was infused into 30 mL of de-alcoholized red wine. The infused wine was stored with the control (uninfused wine) together at room temperature. FIG. 12 shows the visual effect of all samples 30 days post infusion. Clear sediment can be observed in C1, C4 and N1 emulsion infused samples. There are slight sediments on the bottom of C2 and C5 emulsion infused samples, see FIGS. 13 and 14. The observation showed that the N2, O1 and O2 emulsions are physically compatible with the red wine.

C1, C2, C4, C5 and N1 emulsion are used in many different beverages, which were shown to be compatible, their use case can be found in Table 4. C1, C2 and C4 are often used in carbonated beverage when transparency is needed for the beverage. They usually have a quick onset and slight bitter taste. C5 is often used in white wine and also for condition that high heat processing is required during the thermal process. N1 is often used to infuse the regular juice and coffee due to the compatible flavors it offers to those beverage.

TABLE 4

| C1, C2, C4, C5 and N1 emulsion use case | | | | | |
|---|---|---|---|---|---|
| | C1 | C2 | C4 | C5 | N1 |
| Use Case | Carbonated beverage when transparency is needed | | | White wine | Regular juice and Coffee |
| Feature | Transparent and quick onset, but taste slight bitter | | | Heat stable | Milky, less bitter, taste great with coffee |

N2 emulsion: N2 emulsion uses the combination of sucrose ester and lecithin. The sucrose esters can be the Habo Monoester L90, which is a commercially available food-grade sucrose monoester of lauric acid; it can also be Habo Monoester P90, which is a commercially available food-grade sucrose monoester of palmitic acid. Either of the sucrose esters need to be combined with sunflower lecithin to produce a stable emulsion. Table 5 shows the possible ratios of the ingredients for N2 emulsion.

During production, the cannabinoids were first weighed out and carrier oil was added. The cannabinoids and carrier oil were fully mixed to form a homogenous oil phase. Then sunflower lecithin was added into the oil phase under stirring. In some cases, heat may be applied here to generate a homogenous phase. Sucrose esters are dissolved into water separately. Upon dissolving, the oil phase and water phase were mixed together until high shear mixing. And the energy was applied into the mixture by ultrasonication until the droplet size reaches the desired range. Emulsion was then filtered by 0.2 um to 2.4 um filter into final packaging container.

The N2 infused red wine tastes 20% more bitter than the regular red wine, but it adds to the complexity of the full tasting experience. It can be a feature to apply to certain infused red wine brands.

TABLE 5

| N2 emulsion basic ingredient ratios. | |
|---|---|
| Items | Mass (g) |
| Cannabinoids (CBD or THC) | 1 |
| Sunflower oil or olive oil or solid coconut oil, liquid coconut oil or other MCT oils | 1-5 |
| Sucrose monoester of lauric acid or Sucrose monoester of palmitic acid | 1-6 |
| Natural Sunflower lecithin or purified lecithin | 0.15-3 |
| Water | 35-46.75 |
| Citric acid or benzoic acid (optional, not active) | 0.001 or 0 |

O1 emulsion: O1 emulsion was generated by the emulsifier called Q-Naturale®. Q-Naturale® is a natural emulsifier that is extracted from a plant. Therefore, in some embodiments, the emulsifier is not a polymeric hydrocolloid, but is instead a molecule such as, for example, that provided as quillaja, or Naturale® (sold by Ingredion), which is derived from the quillaja tree. The ingredient ratios examples can be found in Table 6 below. Sometime, a slight addition of gum acacia as co-emulsifier can improve the mouth feel and taste of emulsion infused red wine.

TABLE 6

| O1 emulsion ingredient ratios | |
|---|---|
| Items | Mass (g) |
| Cannabinoids (CBD or THC) | 1 |
| Sunflower oil or olive oil or solid coconut oil, | 1-5 |

TABLE 6-continued

| O1 emulsion ingredient ratios | |
|---|---|
| Items | Mass (g) |
| liquid coconut oil or other MCT oils | |
| Q-Naturale ® 100, 200, 200V or 300 | 1-4.5 |
| Gum Acacia | 0-0.2 |
| Water | 39.5-47 |
| Citric acid or benzoic acid (optional, not active) | 0.001 or 0 |

The emulsion made based on the ratios above, often offers a white/milky look. The concentrated emulsion may sometimes have an acidic smell. When diluted into water, it forms a light milky solution and the acidic smell disappears. The taste of the emulsion is very smooth with minimum bitterness. The droplet size of diluted emulsion is tested to be 150-250 nm by DLS (Dynamic Light Scattering). See FIG. 9 as one DLS result based on this emulsion.

02 emulsion: The 02 emulsion was produced using gum acacia as the main emulsifier. Cananbinoids were mixed into carrier oil to form a homogeous oil phase. Gum acacia is first dissolved into water under high shear mixing. Then the oil phase and water phase are mixed together to form a coarse emulsion. Then ultrasonication is used to apply energy to generate a stable emulsion. Ingredient ratios can be found in Table 7.

TABLE 7

| O2 emulsion ingredient ratios | |
|---|---|
| Items | Mass (g) |
| Cannabinoids (CBD or THC) | 1 |
| Sunflower oil or olive oil or solid coconut oil, liquid coconut oil or other MCT oils | 1-5 |
| Gum Acacia or Pre-hydrolyzed Gum Acacia | 3-12 |
| Q-Naturale ® | 0-0.2 |
| Water | 32-45 |
| Citric acid or benzoic acid (optional, not active) | 0.001 or 0 |

The O1 and O2 emulsions are usually made from the combination of high shear mixing-microfluidic, homogenization-microfluidic, sonication, or sonication-microfluidic.

For example, one way to generate this emulsion is to use sonication along: first, weigh out active ingredient (cannabinoids or other ingredients), then add liquid coconut oil to certain ratio of the active ingredient, stir them well until they mix into one homogenous phase, sometimes, heat is applied n this step. Weigh out Q-Naturale® or Gum Acacia and add water into it, mix them together and pour them into the oil phase. Run the mixture by ultrasonication at 100% amplitute to produce a homogenous emulsion. Keep monitoring droplets size change using Dynamic Light Scattering until the size hit 150-200 nm for O1 formula or 400-500 nm for 02 formula.

Another way to generate this emulsion is through the combination of ultrasonication-microfluidic system. Repeat the steps above until the droplet size reaches ~300 nm for O1 formula or 600 nm for 02 formula. Then, the emulsions were flowed through microfluidics device at 30,000 PSI for 1-2 pathes.

This emulsion can also be produced by the combination of homogenization-microfludic system. After mixing the aqueous and oil parts together, apply energy into the mixture through a high shear homogenizer until a coarse emulsion (droplet size ~1000 nm). Then the emulsion is flowed through a microfluidic device for 3-5 pathes until droplet size reaches ~150 nm.

Not only the fact that N2, O1 and 02 emulsions are stable with red wine was unexpected, the three emulsions also provides a system to produce cannabis infused red wine for desired taste, appearance and experience. See table 8 as summary of N2, 01 and 02 emulsion characterizations comparison.

TABLE 8

| Summary of N2, O1 and O2 emulsion characterizations | | | | | |
|---|---|---|---|---|---|
| | Average Droplet Size (nm) | Infused red wine turbidity (NTU) at 50 mg/750 mL | Taste profile in red wine | Onset (mins) | Duration (hours) |
| N2 | 80 | 22 | Slight bitter, generate multilayer of flavor | 5 | 3 |
| O1 | 200 | 750 | Almost indistinguishable | 10 | 5 |
| O2 | 500 | 1415 | Add smooth mouth feel | 20 | 6 |

The N2, O1 and O2 formulas provide a fleet of emulsions that can be utilized to make customized cannabis infused red wines. The flavor, the appearance and experience can be tailored. For example, if transparency is critical, N2 formula is the best option. If the organic ingredient label is desired and not sacrificing the appearance, the O1 formula should work.

The effect of the N2, 01 and 02 emulsions on ten subjects were tested. In this study, THC was used as active ingredient. 10 mg THC was consumed by 10 people at three different days by formula N2, O1 and 02 respectively. After consumption, the feeling change over time was logged and the data was averaged and combined into FIG. 15. The feeling log was referred to Table 9.

TABLE 9

| Feeling intensity difinitions for emulsion absorption study. | |
|---|---|
| Intensity | Definitions |
| 0 | No Felt Effects |
| 1-2 | Onset of Body High/Slight Euphoria |
| 3-4 | Obvious Body High/Obvious Psychoactivity |
| 5-6 | Slight THC Incapacitation/Slight Couchlock |
| 7-8 | Strong THC Incapacitation/Strong Couchlock |
| 9 | Uncomfortable/Intense THC High |

Figure 15:
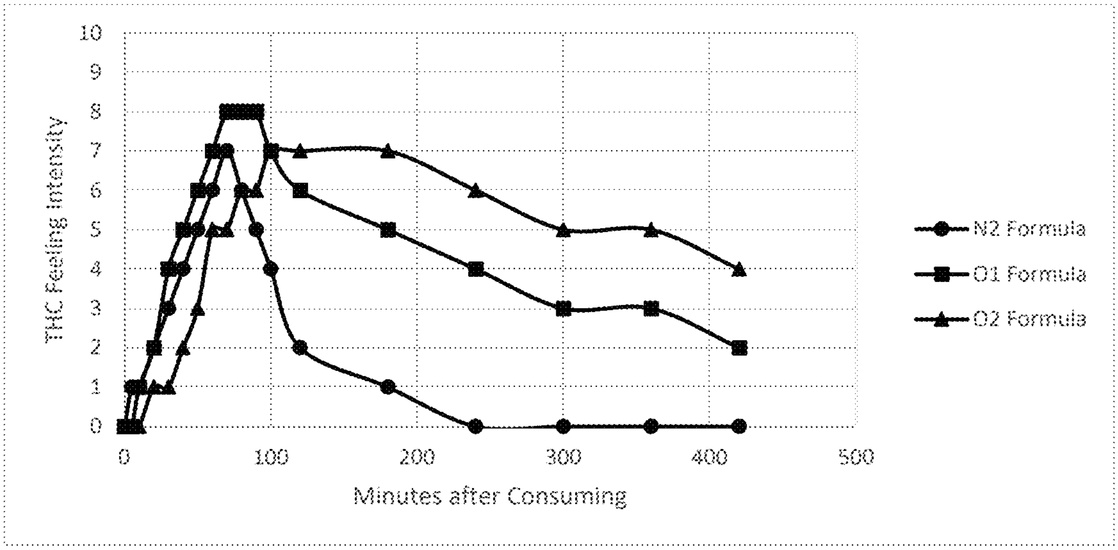
FIG. 15 illustrates feeling difference between three major emulsion types when using THC as active

As can be seen from FIG. 15 and Table 8, the color, effect of cannabinoid and the taste of the cannabis wine beverage can be carefully controlled by using the compostions disclosed herein. Sucrose ester emulsion (N2) can be used to create infused red wine that has a quicker onset and offset, Q-Naturale® emulsion (O1) can be used to create infused red wine that offer a longer duration of releasing of active, Gum Acacia (O2) emulsion can be used to infused red wine that has longest duration of releasing of the active.

In the above referenced study, the effect of the THC in the N2 emulsion was felt as early as 10 minutes after consumption, and the effect disappeared completely in about 3 hours after consumption. In case of the O1 emulsion, the effect of the THC was also felt after about 10 minutes, and the effect lasted for more than 5 hours, the maximum intensity of the effect being around 60-80 minutes. In case of the 02 emulsion, the effect of the THC was rather delayed—the effect was first noticed after about 20 minutes, but lasted for more than 6 hours, the maximum intensity of the effect being around 100-180 minutes.

The appearance of the red wine can also be carefully controlled based on the emulsion used in the cannabinoid wine beverage. As disclosed herein, sucrose ester emulsion can be used to create transparent infused red wine, Q-Naturale® emulsion can be used to create slight hazy infused red wine, Gum Acacia emulsion can be used to create darker color infused red wine.

Finally, the taste of the red wine beverage is also controllable based on the emulsion. The sucrose ester emulsion infused red has a slight bitter multilayer taste, Q-Naturale® emulsion infused red wine taste mostly like the regular red wine, and Gum Acacia emulsion infused red wine has a smooth mouth feel.

Thus, unlike traditional alcohol based red wine, where the user just feels the effect of ethanol, the cannabis infused red wine provides targeted experience based on the cannabinoid used as well as the choice of the emulsion systems. For example, mixing the N2 emulsion with a polyphenol rich beverage leads to a beverage composition that has quick onset and offset time for the effect of the cannabinoid. On the other hand, mixing the 02 emulsion with a polyphenol rich beverage leads to a beverage composition that has a prolonged onset and offset time for the effect of the cannabinoid.

Terpenes can also be treated as the active ingredient, or together with the cannabinoids as the combined ingredients within the emulsion of N2, O1 and O2. And those types of emulsions can also be infused into the high polyphenolic beverage such as red wine. The added terpenes not only add to the flavor complexity of the drink, but they can also bring the entourage effect when absorb together with cannabinoids.

The CBD emulsion described above was infused into a red wine, targeting 0.1 mg/mL concentration. When the infused red wine was tested for cannabis potency using HPLC-DAD, the result showed that the CBD can be accurately tested using the regular extraction method, see FIG. 10. It also shows that after infusing, this emulsion droplets are homogeneous throughout the red wine thus offering the consistant result.

Potency of this emulsion in young coconut water was also tested. The emulsion was infused into coconut water from virgin coconuts. It is known that coconut water from virgin coconuts contains an enzyme called Polyphenol oxidase (PPO). Overtime, under sunlight and oxygen, PPO can convert small polyphenols into larger polyphenols, thus making the young coconut water pink. Most emulsifiers have sedimentations with young coconut water. When the new CBD emulsion is infused to target 0.1 mg/mL concentration, HPLC-DAD can accurately detect it, see FIG. 11. It illustrates that the new emulsion disclosed here can be used to infuse young coconut water and make the active ingredient homogenous throughout the drink.

The emulsion stability was tested at diluted level (0.1 mg/mL) in a 55° C. oven for 12 weeks, which is equal to 3 years at room temperature. Over the course of testing, there was no layer separation within the aqueous phase. The emulsion droplet size was measured at the beginning of the test and at the end of the 12 weeks. For all three emulsions, the droplet size growth is less than 15% during the time period. The result showed that these emulsions are physically stable for 3 years at room temperature.

The emulsion was later tested in high polyphenolic drinks: a red wine and a pomegranate juice. The testing emulsion contains CBD as active ingredient, and the emulsion was infused into both drink bases at 10 mg CBD per 300 mL (0.033 mg/mL). After the drink was infused, it was kept in 45° C. oven for acceleration study. 1 day at 45° C. is roughly equal to 5 days at room temperature. The time course was 1 week, 3 weeks, 5 weeks, 10 weeks, 15 weeks and 21 weeks. 21 weeks at 45° C. is equal to 2 years of shelf life at room temperature. Couple of factors were monitored during the stability phase to evaluate the overall stability: the look, the taste, the droplet size, turbility, pH and potency.

Through stability data, each of the parameters listed above stayed the same as the day 0 throughout the testing period. It shows that this emulsion is compatible with red wine.

This method can also be used to infuse any high polyphenolic drinks with emulsion technology, for example, infuse DHA emulsion into permanganate juices, or infuse Co-Q10 emulsion into grape juice or vitamins emulsion into young coconut water.

In one embodiment, the emulsions disclosed herein may be prepared by at least the following steps. The first step comprises mixing the cannabinoid and carrier oil until a homogenous phase is reached. Then, the second step comprises adding the emulsifier into the homogenous mixture of cannabinoid and carrier oil phase or added into the water. Water and oil phase are then combined together to make a coarse emulsion. Finally, energy is introduced either from sonication or microfluidics to produce desired final emulsion. Ideally, the temperature of the mixture is kept below 60° C. during the production process. In another embodiment, the emulsion may be prepared using the methods disclosed in PCT/US2019/041965, which is incorporated by reference herein in its entirety.

Given traditional wine/beer/spirit sales are going down, and the benefit of cannabis is getting more attention, it is believed that this disclosure would be greatly helpful in making cannabis infused red wines. This will create a brand-new product category that offers the taste of red wine but a new experience of cannabis. Since the active ingredient can be any kind of cannabinoids, a THC infused red wine may be designed for party time, a CBD infused red wine for pain relief, a CBN infused red wine for sleep aid etc. Also, this emulsion offers minimum flavor change to the red wine, even at high potency (100 mg in 750 mL bottle), it offers great flexibility to product makers to generate targeted spec red wine. Terpenes can also be interesting. Most of them are oil soluble, thus making it difficult to integrate into beverages. Using this new emulsion formula, terpenes can be infused into red wine, not only can it adds special flavors, but its synergistic effect with cannabinoids can really make the overall experience unique and enjoyable.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An emulsion system for producing a cannabis-infused beverage, comprising:

an emulsion that is stable in combination with a high polyphenolic beverage, the emulsion comprising about 2-10 wt % cannabinoid; about 2-10 wt % of a carrier oil; about 2-24 wt % of an amphipathic glycoside composition; and about 64-94 wt % of water;

wherein the amphipathic glycoside composition is selected from the group consisting of quillaja saponin and gum acacia;

wherein the amount of carrier oil is at least equal to the amount of the cannabinoid, wherein the quillaja saponin is at least 0.25 times the total amount of the cannabinoid and the carrier oil, and wherein the gum acacia is at least 1.5 times the total amount of cannabinoid and carrier oil; and wherein when the emulsion is mixed with a high-polyphenolic beverage, a cannabis-infused beverage comprising a turbidity of 22-1415 NTU is produced, wherein the transparency or taste of the cannabis-infused beverage is determined by the amphipathic glycoside composition that is selected for use in the system, and wherein said turbidity confirms stability of the emulsion in combination with the high polyphenolic beverage.

2. The emulsion system of claim 1, wherein the concentration of the cannabinoid in the beverage composition is between 10-500 mg/750 mL.

3. The emulsion system of claim 2, wherein the emulsion comprises an average droplet size of 80-500 nm and wherein the turbidity increases with average droplet size, and wherein the turbidity increases with cannabinoid concentration.

4. The emulsion system of claim 1, wherein the carrier oil comprises one or more of sunflower oil, olive oil, coconut oil, sesame oil, avocado oil, palm oil, soybean oil, corn oil, peanut oil, or canola oil.

5. The emulsion system of claim 1, wherein the cannabinoid is selected from the group consisting of tetrahydrocannabinolic acid A (THCA-A), tetrahydrocannabinolic acid B (THCA-B), tetrahydrocannabinol (THC), tetrahydrocannabinolic acid C (THCA-C), tetrahydrocannbinol C (THC-C), tetrahydrocannabivarinic acid (THCVA), tetrahydrocannabivarin (THCV), tetrahydrocannabiorcolic acid (THCA-C), tetrahydrocannabiorcol delta-7-cis-iso-tetrahydrocannabivarin, delta-8-tetrahydrocannabinolic acid (Δ8-THCA), delta-tetrahydrocannabinol (Δ-THC), cannabidiolic acid (CBDA), cannabidiol (CBD), cannabidiol monomethylether (CBDM), cannabidiol-C (CBD-C), cannabidivarinic acid (CBDVA), cannabidivarin (CBDV), cannabidiorcol (CBD-C), cannabigerolic acid (CBGA), cannabigerolic acid monomethylether (CBGAM), cannabigerol (CBG), cannabigerol monomethylether (CBGM), cannabigerovarinic acid (CBGVA), cannabigerovarin (CBGV), cannabichromenic acid (CECA), cannabichromene (CBC), cannabichromevarinic acid (CB CV A), cannabichromevarin (CBCV), cannabicyclolic acid (CBLA), cannabicyclol (CBL), cannabicyclovarin (CBL V), cannabielsoic acid A (CBEA-A), cannabielsoic acid B (CBEA-B), cannabielsoin (CBE), cannabinolic acid (CENA), cannabinol (CBN), cannabinol methylether (CBNM), cannabinol-C (CBN-C), cannabivarin (CBV), cannabino-C (CBN-C), cannabiorcol (CBN-C), cannabinodiol (CBND), cannabinodivarin (CBDV), cannabitriol (CBT), 10-ethoxy-9-hydroxy-delta-6a-tetrahydrocannabinol, 8,9-Dihydroxy-delta-6a-tetrahydrocannabinol (8,9-Di-OH-CBT-C), cannabitriolvarin (CBTV), ethoxy-cannabitriolvarin (CBTVE), dehydrocannabifuran (DCBF), cannbifuran (CBF), cannabichromanon (CBCN), cannabicitran (CBT), 10-oxo-delta-6a-tetrahydrocannabinol (OTHC), delta-9-cis-tetrahydrocannabinol (cis-THC), cannabiripsol (CBR), 3,4,5,6-tetrahydro-7-hydroxy-alpha-alpha-2-trimethyl-9-n-propyl-2,6-methano-2H-1-benzoxocin-5-methanol (OHiso-HHCV), trihydroxy-delta-9-tetrahydrocannabinol (triCH-THC), isocannabinoids, and epigallocatechin gallate.

6. The emulsion system of claim 1, wherein the beverage is one or more of red wine, de-alcoholized red wine, rose wine, de-alcoholized rose wine, green tea, black tea, a fruit juice selected from pomegranate juice, grape juice, white grape juice, cranberry juice, raspberry juice, apple juice, watermelon juice, beetroot juice, orange juice, peach juice, grapefruit juice, cherry juice, blueberry juice, cranberry juice, black elderberry juice, blackcurrant juice, plum juice, blackberry juice, strawberry juice, apricot juice, young coconut water, or any combination thereof.

7. The emulsion system of claim 1, wherein the emulsion maintains stability in the high polyphenolic beverage after undergoing a sterilization process, wherein the sterilization process is selected from one or more of tunnel pasteurization, retort, high temperature short time, aseptic, hot fill or dimethyldicarbonate.

8. The emulsion system of claim 1, wherein the emulsion further comprises one or more of vitamin A, vitamin D, vitamin E, vitamin K, DHA, omega 3, punicic acid, fish oil, flaxseed oil, hemp seed oil, curcumin, lutein, CoQ-10, flavor oil or terpenes.

9. The emulsion system of claim 1, wherein the cannabis-infused beverage comprises organic ingredients.

10. A method of controlling onset and offset time of a cannabinoid in a high polyphenol beverage the method comprising infusing an emulsion of (a) about 2 wt % of a cannabinoid; (b) about 2-10 wt % of a carrier oil; (c) about 2-24 wt % of an amphipathic glycoside composition; and (d) about 64-94 wt % of water into a high-polyphenol beverage:

providing a sucrose ester and sunflower lecithin as the amphipathic glycoside composition for an onset time of 5-10 minutes and an offset time of about 3 hours; or providing an extract of a quillaja saponin as the amphipathic glycoside composition for an onset time of about 10 minutes and an offset time of about 5 hours; or providing gum acacia and/or pre-hydrolyzed gum acacia as the amphipathic glycoside composition for an onset time of about 20 minutes and an offset time of about 6 hours.

11. A method of controlling the taste of a cannabis-infused high-polyphenol beverage, the method comprising, infusing an emulsion of (a) about 2 wt % of a cannabinoid; (b) about 2-10 wt % of a carrier oil; (c) about 2-24 wt % of an amphipathic glycoside composition; and (d) about 64-94 wt % of water into a high-polyphenol beverage; and providing a sucrose ester and sunflower lecithin as the amphipathic glycoside solution to provide an increased bitter taste compared to the beverage without the emulsion; or providing an extract of a quillaja saponin as the amphipathic glycoside composition to provide a same level of bitter taste compared to the beverage without the emulsion; or providing gum acacia and/or pre-hydrolyzed gum acacia as the amphipathic glycoside composition to provide a decreased bitter taste compared to the beverage without the emulsion.

12. An emulsion system for producing a cannabis-infused beverage, comprising:

an emulsion that is stable in combination with a high polyphenolic beverage, the emulsion comprising about 2-10 wt % cannabinoid; about 2-10 wt % of a carrier oil; about 2-24 wt % of an amphipathic glycoside composition; and about 64-94 wt % of water;

wherein the amphipathic glycoside composition is selected from the group consisting of quillaja saponin and gum acacia;

wherein the amount of carrier oil is at least equal to the amount of the cannabinoid, wherein the quillaja saponin is at least 0.25 times the total amount of the cannabinoid and the carrier oil, and wherein the gum acacia is at least 1.5 times the total amount of cannabinoid and carrier oil;

wherein when the emulsion is mixed with a high-polyphenolic beverage, a cannabis-infused beverage comprising a turbidity of 22-1415 NTU is produced, wherein the transparency or taste, of the cannabis-infused beverage is determined by the amphipathic glycoside composition that is selected for use in the system;

wherein stability of the emulsion in combination with the high polyphenolic beverage is confirmed by no observable sediment in the combination from 30 minutes up to 30 days;

and wherein potency and homogeneity of the combination are maintained.

* * * * *